No. 750,796. PATENTED FEB. 2, 1904.
H. J. BERKLEY.
NUT LOCK.
APPLICATION FILED MAR. 24, 1903.
NO MODEL.

Witnesses:
Howard Habercam.
Henry Watson

Inventor:
Henry J. Berkley
By Chafin A. Ferguson
Attorney.

No. 750,796. Patented February 2, 1904.

UNITED STATES PATENT OFFICE.

HENRY J. BERKLEY, OF BALTIMORE, MARYLAND.

NUT-LOCK.

SPECIFICATION forming part of Letters Patent No. 750,796, dated February 2, 1904.

Application filed March 24, 1903. Serial No. 149,262. (No model.)

*To all whom it may concern:*

Be it known that I, HENRY J. BERKLEY, a citizen of the United States, residing at Baltimore, in the State of Maryland, have invented certain new and useful Improvements in Nut-Locks, of which the following is a specification.

This invention relates to improvements in nut-locks.

The object of the invention is to provide a device for use upon railway fish-plates, structural ironwork, or upon parts of machinery which are subject to vibration by means of which the nut will be securely locked in position and prevented from working loose by the vibration of the parts upon which it may be used.

The invention is illustrated in the accompanying drawings, in which—

Figure 1:
Figure 2:
Figure 3:
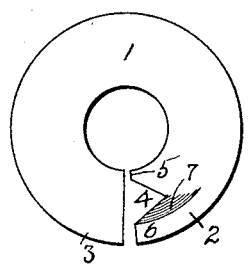
Figure 4:
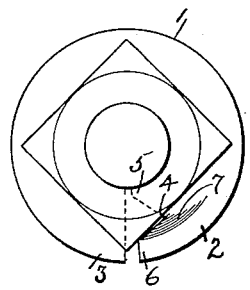

Figure 1 is an edge view showing the open side of the split nut-lock washer, one end of which split is turned upwardly and the other end turned downwardly. Fig. 2 is a cross-sectional view showing the two-pronged end. Fig. 3 is a plan view of the circular nut-lock device. Fig. 4 is also a plan view of the nut-lock and a nut, showing the position of the parts when the nut is locked.

Referring to the drawings, the numeral 1 designates a split washer having one end, 2, thereof bent upwardly and the other end, 3, bent downwardly. The upwardly-bent end 2 is provided with a notch or V-shaped cut-out 4, extending inwardly from the said end and forming two prongs 5 and 6, somewhat resembling a fish-tail. This two-pronged end beside curving upward is slightly tilted in the crosswise direction, so as to place the outer prong 6 in a plane a little higher than the inner prong 5. The outer prong 6 has the same thickness as the other parts of the washer; but the inner prong 5 is ground off on its upper surface, so as to be gradually thinner toward its point. This formation permits the upper surface of the said thinner prong to readily take under the lower surface of the nut when the latter is locked and also permits the higher and thicker outer prong 6 to impinge against the side of the nut, the greater thickness of this prong giving it strength to resist the effort of the nut to turn backward. It is also important to note that the inner prong 5 is relatively thinner than the downwardly-bent end 3 of the washer.

The top surface of the outer prong 6 is slightly inclined sidewise adjacent the V-shaped cut-out 4, as at 7, the inclination extending toward the thinner prong 5, which permits the corners of the nut when the latter is being turned on the bolt to ride up over the said higher prong 6.

The downwardly-bent end 3 of the split washer is provided on its lower surface with a projecting cutting edge 8, which is forced into or takes into the surface of the metal by the pressure of the nut when the latter is turned to tighten, and this cutting edge 8 prevents the said washer from turning in either direction.

To use the nut-lock, the bolt is first placed in position. The split nut-lock washer 1 is then placed over the bolt, with the cutting edge 8 down or against the metal. The nut is then screwed upon the bolt and when it comes in contact with the split washer will compress and straighten the upturned and downturned ends 2 and 3 until they are in alinement. As the corners of the nut in turning pass over the outer prong or locking-shoulder 6 the end 2 will spring up slightly, and the high prongs 6 will prevent the nut from turning backward on the bolt. When the nut is forced down tightly upon the split washer 1, it should occupy the position shown in Fig. 4, with the side of the nut impinging against the higher outer prong 6, which will prevent the nut from turning backward.

The prong 5 being thinner than the downwardly-bent end 3 will allow the full pressure of the nut to come against that end which has the cutting edge 8, and said full pressure will force the cutting edge into the said metal slightly and prevent the washer from turning.

Having thus fully described my invention, what I claim as new, and desire to secure by Letters Patent, is—

1. The herein-described nut-lock consisting of a split washer having one end bent upwardly and said end provided with two prongs, the inner one of which has its upper surface gradually thinned toward its point, and the outer prong being thicker than the inner one and having the same thickness as the other parts of the washer, and also slightly inclined sidewise toward the thinner prong; and the opposite end of the split washer bent downwardly and provided on its lower surface with a cutting edge.

2. As an article of manufacture, a nut-lock consisting of a split washer having at one end, 3, and on the lower surface thereof a cutting edge, and having at the other end, 2, a V-shaped cut-out forming two prongs the outer one of which is as thick as the first-named end of the washer and said outer prong to serve as a locking-shoulder, and the inner prong which in operation is to take under the nut being relatively thinner than the end which has the said cutting edge.

In testimony whereof I affix my signature in the presence of two witnesses.

HENRY J. BERKLEY.

Witnesses:
 CHAPIN A. FERGUSON,
 CHARLES H. MILLIKIN.